United States Patent

Mergell

[11] Patent Number: 5,944,246
[45] Date of Patent: Aug. 31, 1999

[54] WELDING DEVICE WITH A STROKE COMPENSATING ARRANGEMENT

[75] Inventor: Bruno Mergell, Wetzlar-Steindorf, Germany

[73] Assignee: Emhart Inc., Newark, Del.

[21] Appl. No.: 09/026,309

[22] Filed: Feb. 19, 1998

[30] Foreign Application Priority Data

Feb. 19, 1997 [DE] Germany ................ 297 02 926 U

[51] Int. Cl.⁶ .................................................. B23K 9/20
[52] U.S. Cl. .......................... 228/6.1; 228/44.3; 219/98
[58] Field of Search ................... 228/4.1, 6.1, 44.3, 228/212, 213; 219/98, 99; 267/140.12; 279/41

[56] References Cited

U.S. PATENT DOCUMENTS

| | | | |
|---|---|---|---|
| 3,723,700 | 3/1973 | Ettinger | 219/98 |
| 4,435,630 | 3/1984 | Jordan | 219/98 |
| 4,562,329 | 12/1985 | Minton | 219/99 |
| 5,688,414 | 11/1997 | Kondo | 219/98 |

*Primary Examiner*—Samuel M. Heinrich
*Attorney, Agent, or Firm*—Edward D. Murphy

[57] ABSTRACT

A welding device, in particular a stud welding device with a stroke compensating arrangement comprises a clamping member cooperating with a dragging sleeve and a conically shaped region of an actuating pin capable of reciprocating in its longitudinal direction. The dragging sleeve at least partially surrounds the clamping member and the region. The clamping member is designed in the form of a hollow cylinder with at least one elastic portion which can be brought to rest radially on the dragging sleeve by the region, and a carrier member is provided on which the clamping member rests in part.

11 Claims, 1 Drawing Sheet

WELDING DEVICE WITH A STROKE COMPENSATING ARRANGEMENT

BACKGROUND OF THE INVENTION

This invention relates to a stud welding apparatus for applying and welding studs to a workpiece such as, for example, an automotive body part. More specifically, the invention relates to an improved mechanism for automatically adjusting the stroke of the lifting mechanism to compensate for studs of differing length while maintaining a desired lift height from the workpiece.

In the process of attaching studs to workpieces by means of an electric arc, solenoid and spring systems are used to lift the stud away from contact with the workpiece, thus producing an arc, and to plunge the stud into a pool of molten metal produced after an interval by the arc. One of the critical parameters in this process is the lift height which is the maximum distance between the tip of the stud and the surface of the workpiece. If a fixed connection is provided between the stud carrier and the solenoid-spring driving mechanism, difficulties can arise in establishing the accurate lift height when studs of differing length are to be positioned in the stud carrier. In order to accommodate this situation, it is known to provide a clutch mechanism between an actuating pin which is directly connected to the solenoid and a dragging sleeve which is connected to the stud carrier. As the welding apparatus is lowered toward the workpiece to establish initial contact between the stud and the workpiece, the clutch enables the dragging sleeve to be disconnected from the actuating pin as the stud contacts the workpiece, even though the actuating pin may continue to travel a short distance beyond the point of stud contact. When the solenoid is initiated to lift the stud away from the workpiece, the clutch produces engagement between the actuating pin and dragging sleeve at an appropriate point in the stroke so that the dragging sleeve, stud carrier and stud are lifted to precisely the desired lift height away from the workpiece, thus enabling the desired weld to be achieved.

In known apparatus of this type, the stroke compensating arrangement has a clamping member which cooperates with the dragging sleeve and a conically shaped region of the actuating pin capable of reciprocating in its longitudinal direction. With known stroke compensating arrangements, the clamping member is spherical in design. The spherical clamping member is arranged within a duct in a holding member. The spherical clamping member rests on a conically shaped region of an actuating pin. The actuating pin is capable of reciprocating in its longitudinal direction. During the movement of the actuating pin, the spherical clamping member slides on an external surface of a conically shaped region of the actuating pin so the spherical clamping member performs a movement extending substantially perpendicularly to the movement of the actuating pin. The dragging sleeve surrounding the clamping member is arranged at such a distance therefrom that the spherical clamping member is clamped between the conical region and the dragging sleeve by a movement of the actuating pin in one direction creating a rigid connection between the dragging sleeve, the clamping member and the actuating pin. If the actuating pin is moved in an opposing direction, the clamping member is released by the conically shaped region. The rigid connection between the dragging sleeve, the clamping member and the actuating pin is therefore eliminated.

With such a design of a stroke compensating arrangement, a substantially spot-shaped connection is created between the clamping member and the dragging sleeve or the conically shaped region of the movable actuating pin. The forces which can therefore be transmitted by such a system of a stroke compensating arrangement are relatively low. There is also the risk that the dragging sleeve can be slipped through owing to the relatively small area of contact between the clamping member and the conically shaped region of the actuating pin or of the dragging sleeve. The risk of slipping through is increased by wear of the components, so exact stroke compensation cannot be ensured.

SUMMARY OF THE INVENTION

It is an object of the present invention to develop the known welding device with a stroke compensating arrangement so as to allow a secure releasable connection between a dragging sleeve and an actuating pin capable of reciprocating in its longitudinal direction.

The invention provides a welding device, in particular a stud welding device with a stroke compensating arrangement which comprises a clamping member cooperating with a dragging sleeve and a conically shaped region of an actuating pin capable of reciprocating in its longitudinal direction, wherein the dragging sleeve at least partially surrounds the clamping member and the region characterised in that the clamping member is designed in the form of a hollow cylinder with at least one elastic portion which can be brought to rest radially on the dragging sleeve by the region and a carrier member is provided on which the clamping member rests in part.

The welding device according to the invention with a stroke compensating arrangement is distinguished in that the clamping member is designed in the form of a hollow cylinder. The clamping member has at least one elastic portion which can be brought to rest radially on the dragging sleeve by the conically shaped region of the actuating pin. The stroke compensating arrangement also has a carrier member on which the clamping member rests at least in part. The area of contact between the clamping member and the conically shaped region or the dragging sleeve is increased by this design of the stroke compensating arrangement so the dragging sleeve is not slipped through. Wear of the clamping member or of the dragging sleeve is also reduced in comparison with known designs owing to the greater areas of contact. A more precise mode of operation is also achieved with the stroke compensating arrangement. Higher forces can also be transmitted owing to the greater area of contact. This is particularly important if the welding device with a stroke compensating arrangement operates suddenly, i.e. with pronounced acceleration. A further advantage of the design of the welding device according to the invention with a stroke compensating arrangement resides in the fact that, owing to the elastic portions of the clamping member, these elastic portions automatically return to their starting position.

According to a further advantageous feature, it is proposed that the clamping member has at least two portions wherein at least one of the at least two portions of which there is formed by mutually spaced slots extending from a first end face partially in the axial direction of the clamping member to a second end face and at least one of the at least two portions is formed by mutually spaced slots extending from the second end face partially in the axial direction of the clamping member to the first end face. This design produces a clamping member having several elastic portions when observed from one or the other end face in each case, the conical region of the actuating pin allowing the clamping member to expand. The clamping member makes flat contact with the dragging sleeve.

The welding arrangement is preferably designed such that at least one slot formed in the clamping member, preferably each slot, opens into an orifice. A design in which at least one orifice, in particular each orifice, has a substantially circular cross section is preferred. Owing to this design, a desirable distribution of tension, and therefore loading of the clamping member, is achieved in the end region of the slots in the welding arrangement. Circular cross sections can be achieved by simple drilling. The proposed clamping member is therefore also relatively easy to produce.

In order to improve the mode of operation of the stroke compensating arrangement, it is proposed that the carrier member be designed to taper to the region of the actuating pin. Owing to this design of the stroke compensating arrangement, the clamping member is expanded both by the conically shaped region of the actuating pin and also by the tapering edge portion of the carrier member.

For defined sliding behaviour of the clamping member on the conically shaped region of the actuating pin or on the tapering edge portion of the carrier member, it is proposed that the clamping member has internal surface regions which extend conically to the first or to the second end face.

To ensure that the clamping member automatically returns into a starting position when the clamping member is released by the actuating pin, it is proposed that an angle of the conical region of the actuating pin, of the tapering edge portion of a carrier member and/or of the internal surface region of the clamping member and a coefficient of friction of the surfaces sliding on one another be selected so as to avoid self-locking between the clamping member and the conical region of the actuating pin or the tapering edge portion of the carrier member.

BRIEF DESCRIPTION OF THE DRAWINGS

An embodiment of a welding device with a stroke compensating arrangement will now be described with reference to the accompanying drawings, in which:FIG.

DESCRIPTION OF THE PREFERRED EMBODIMENT

Figure 1:
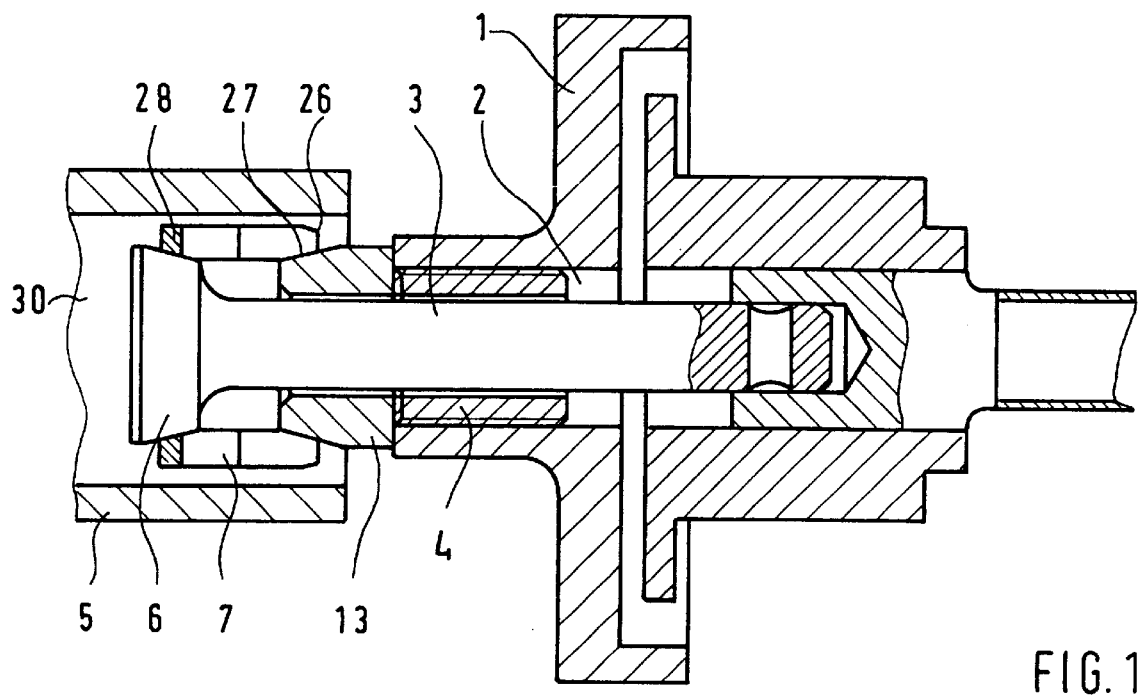
FIG. 1 shows schematically a detail of a welding device with a stroke compensating arrangement.

FIG. 1 shows a detail of a welding device with a stroke compensating arrangement. A duct 2 in which an actuating pin 3 is arranged is formed in a housing part 1. A guide member 4 in which the actuating pin 3 is guided is arranged in the duct 2. The actuating pin 3 is capable of reciprocating in its longitudinal direction. A substantially conically shaped region 6 is provided at one end of the actuating pin 3. A carrier member 13 through which the actuating pin 3 extends is provided at a distance from the conically shaped region 6. The carrier member 13 is connected to the housing part 1.

The carrier member 13 has a tapering edge portion 26. The edge portion 26 tapers toward the conically shaped region 6 of the actuating pin 3. The conically shaped region 6 and the tapering edge portion 26 form a V-shaped socket in which a clamping member 7 is arranged. The clamping member 7 is surrounded by a dragging sleeve 5.

Figure 2:
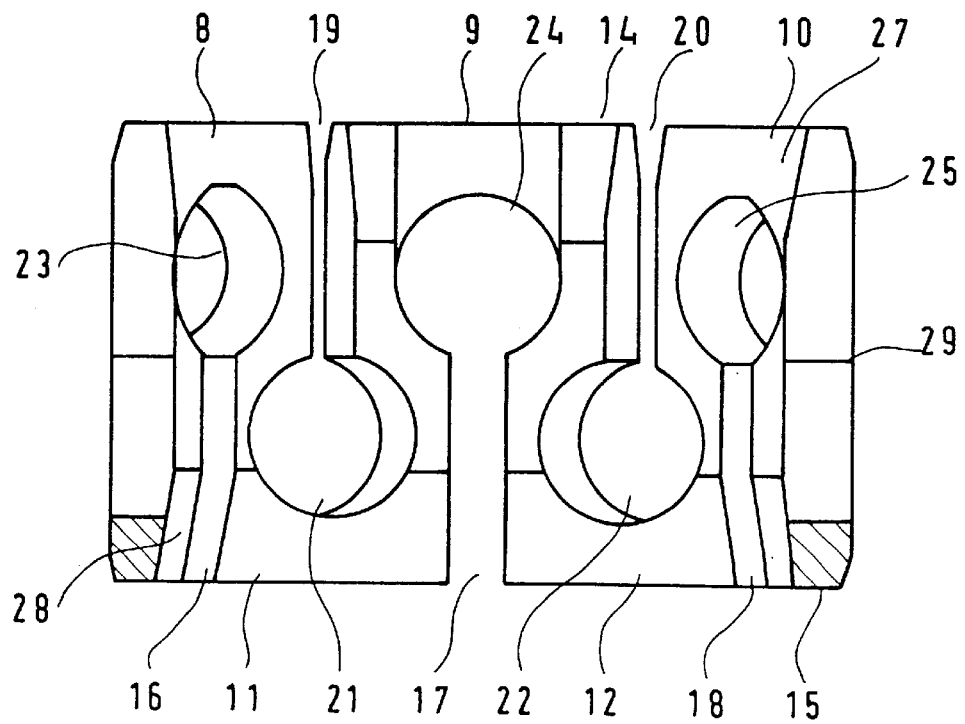
FIG. 2 shows a clamping member in section.

The clamping member 7, as shown in particular in FIG. 2, is designed substantially in the form of a hollow cylinder. The clamping member 7 has portions 8, 9, 10, 11 and 12 which extend substantially in the longitudinal direction of the clamping member 7. As shown in particular in FIG. 2, the portion 9 is formed by the mutually spaced slots 19, 20 extending from a first end face 14 partially in the axial direction of the clamping member 7. Slots 16, 17, 18 extend from the second end face 15 in the axial direction of the clamping member, forming the portions 11 and 12. FIG. 2 shows the clamping member 7 in section. It is substantially symmetrical in design. The slots 16, 17, 18, 19, 20 open into orifices 21, 22, 23, 24, 25 having a substantially circular cross section.

The clamping member 7 has internal surface regions 27, 28 which extend conically to the first end face 14 and to the second end face 15.

Owing to a movement of the actuating pin 3 in the direction of the carrier member 13, the internal surface region 28 of the clamping member 7 slides on the conically shaped region 6. At the same time, the internal surface region 27 of the clamping member 7 slides on the tapering edge portion 26 of the carrier member 13. The clamping member 7 is expanded by this movement. The outer face 29 formed by the portions 8, 9, 10, 11, 12 comes to rest on a surface 30 of the dragging sleeve 5. A substantially non-positive connection between the dragging sleeve 5 and the actuating pin 3 is created.

When the actuating pin 3 is moved to the left in FIG. 1 into its rest position, the conical surface 6 and the tapering edge portion 26 move apart, thus allowing the clamping member 7 to retract from contact with the internal surface 30 of the sleeve 5. This breaks the mechanical connection between the sleeve 5 and the actuating pin 3.

In use, a stud is placed in a stud carrier attached to the forward end of the dragging sleeve 5. When the tool is brought to a workpiece and the stud makes contact therewith, the dragging sleeve 5 is not positively connected to the tool. Thus, the stud, the stud carrier and the sleeve remain stationary in contact with the workpiece as the tool completes its forward stroke. When the solenoid is initiated to lift the stud away from the workpiece and create the welding arc, the pin 3 with its conical surface 6 moves toward the carrier 13 with its tapered edge portion 26. This expands clamping member 7 to engage the internal surface of the dragging sleeve 5, and the entire structure becomes coupled together for movement in the lift direction. The actuating pin is driven just enough further to achieve the desired lift height. After a suitable interval, a suitable device such as a spring, not shown, then drives the stud into the melt pool.

Because the clamping member 7 is released from contact with the sleeve 5 at the moment the stud contacts the workpiece and is re-engaged therewith after a known relative movement between the pin 3 and the carrier 13, stroke length compensation is automatically provided, thus enabling use of the mechanism with studs of differing length.

In accord with the present invention, the clutch mechanism described herein provides a large area of surface contact between the various parts, thus avoiding the disadvantages of the prior art and enabling the advantages previously set forth.

While a preferred embodiment of this invention has been illustrated and described, it is intended that the appended claims cover all modifications and variations thereof as may fall within the true spirit and scope of this invention.

What is claimed is:

1. Welding device, in particular a stud welding device with a stroke compensating arrangement which comprises a clamping member cooperating with a dragging sleeve and a conically shaped region of an actuating pin capable of reciprocating in its longitudinal direction, wherein the dragging sleeve at least partially surrounds the clamping member and the region, characterised in that the clamping member is designed in the form of a hollow cylinder with at least one elastic portion which can be brought to rest radially on the dragging sleeve by the region, and a carrier member is provided on which the clamping member rests in part.

2. Welding device according to claim 1, characterised in that the clamping member has at least two portions wherein at least one of the portions of which there are at least two is formed by mutually spaced slots extending from a first end face partially in the axial direction of the clamping member to a second end face and at least one of the portions of which there are at least two is formed by mutually spaced slots extending from the second end face partially in the axial direction of the clamping member to the first end face.

3. Welding device according to claim 2, characterised in that at least one slot, opens into an orifice.

4. Welding device according to claim 3 characterised in that each slot opens into an orifice.

5. Welding device according to claim 3 characterised in that the or each orifice has a cross-section which is greater than the or each slot.

6. Welding device according to claim 3 characterised in that at least one orifice, has a substantially circular cross section.

7. Welding device according to claim 6 characterised in that each orifice has a substantially circular cross-section.

8. Welding device according to claim 1, characterised in that the carrier member is designed to taper to the region of the actuating pin.

9. Welding device according to claim 8, characterised in that the carrier member has a tapering edge portion (26).

10. Welding device according to claim 1, characterised in that the clamping member has internal surface regions which broaden conically toward the first end face and toward the second end face.

11. Welding device according to claim 10, characterised in that an angle of the region of the actuating pin, of the tapering edge portion and/or of the internal surface regions of the clamping member and a coefficient of friction of the surfaces which slide on one another are calculated to avoid self-locking between the clamping member and the conical region of the actuating pin or the tapering edge portion of the carrier member.

* * * * *